US008266456B2

(12) United States Patent
Chang et al.

(10) Patent No.: US 8,266,456 B2
(45) Date of Patent: Sep. 11, 2012

(54) SUPPLYING REMAINING AVAILABLE CURRENT TO PORT IN EXCESS OF BUS STANDARD LIMIT

(75) Inventors: Ray Chang, Sunnyvale, CA (US); David Ferguson, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 847 days.

(21) Appl. No.: 11/974,699

(22) Filed: Oct. 15, 2007

(65) Prior Publication Data

US 2009/0100275 A1    Apr. 16, 2009

(51) Int. Cl.
*G06F 1/26* (2006.01)

(52) U.S. Cl. ..................... 713/300; 710/105

(58) Field of Classification Search .............. None
See application file for complete search history.

(56) References Cited

U.S. PATENT DOCUMENTS

| | | | |
|---|---|---|---|
| 5,787,298 A | 7/1998 | Broedner et al. | |
| 6,087,804 A | 7/2000 | Suda | |
| 6,996,727 B1 | 2/2006 | Snyder et al. | |
| 7,024,567 B2 | 4/2006 | Kim et al. | |
| 7,043,646 B2 * | 5/2006 | Enami et al. | 713/300 |
| 7,069,347 B1 | 6/2006 | Kolokowsky | |
| 7,159,132 B2 * | 1/2007 | Takahashi et al. | 713/310 |
| 7,188,263 B1 | 3/2007 | Rubinstein et al. | |
| 7,194,638 B1 | 3/2007 | Larky | |
| 7,219,180 B1 | 5/2007 | Frank | |
| 7,519,837 B2 * | 4/2009 | Smith et al. | 713/300 |
| 7,714,534 B2 * | 5/2010 | Bayne et al. | 320/106 |
| 7,779,276 B2 * | 8/2010 | Bolan et al. | 713/300 |
| 2002/0038395 A1 * | 3/2002 | Onishi | 710/62 |
| 2006/0190745 A1 * | 8/2006 | Matsushima et al. | 713/300 |
| 2008/0114997 A1 * | 5/2008 | Chin | 713/321 |
| 2008/0166968 A1 * | 7/2008 | Tang et al. | 455/41.2 |
| 2008/0244282 A1 * | 10/2008 | Hansalia et al. | 713/300 |

* cited by examiner

*Primary Examiner* — Kenneth Kim
(74) *Attorney, Agent, or Firm* — Gazdzinski & Associates, PC

(57) ABSTRACT

Methods and apparatus for dynamically adjusting the amount of power (or current) distributed to one or more connected devices via electrical interfaces. In one embodiment, the apparatus comprises a first module adapted to detect current drawn by a first set of ports, and a second module adapted to adjust the current provided to a second set of ports based on the detected current. The second module is also optionally adapted to distribute unreserved current among the devices according to an allocation protocol. In the exemplary context of a plurality of interconnected serial bus devices, the invention enables a device to draw more current than that required to be reserved for that device (such as to comply with a specification such as USB), yet without increasing the total amount of power which must be dedicated to the serial ports as a whole. Power supply efficiency may also be advantageously optimized.

21 Claims, 10 Drawing Sheets

SUPPLYING REMAINING AVAILABLE CURRENT TO PORT IN EXCESS OF BUS STANDARD LIMIT

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of electrical and electronics power distribution. More particularly, the present invention is directed in one exemplary aspect to apparatus and methods for dynamically allocating current among a plurality of electrical ports on electronic devices.

2. Description of Related Technology

Many data bus specifications today require that a host controller or other such device supply a specific amount of electrical power to each port of the controller. For example, the latest Universal Serial Bus (USB) specification, USB 2.0 requires a supply of 2.5 Watts (0.5 A @ +5V), or 500 mA (minimum) per port. Thus, in an exemplary two-port USB system, the power supply must have approximately 1000 mA budgeted exclusively for USB.

In the near future, devices will be capable of accommodating (and some may in fact require) more current than the fixed amount required by a governing specification. For example, a USB-compliant portable end user device (such as for example an mp3 player or the like) may be needed to draw up to 1100 mA of current (such as based on a manufacturer's design specification), and in fact may be physically capable of higher currents (e.g., 1500 mA). Current that is not used to directly power the mp3 player is often ultimately used for other purposes, such as charging the device's batteries. Obviously, the more current that the device is able to draw (given the same baseline load), the faster its batteries will charge. Advantageously, this means less waiting or "down" time for the user.

However, if the amount of current to be supplied is overbudgeted in the power supply, then the power supply often will no longer operate efficiently. Essentially, the efficiency of the power supply turns largely on its associated load. For instance, a typical computer power supply (5.0 V), may be capable of a total output of 2200 mA, yet has a fairly narrow peak efficiency band (say at 1600 or 1700 mA). In effect, the power supply must be designed for maximum power output (e.g., to accommodate high-draw devices), thereby making it less efficient at lower and typically more common levels. Hence, operating this power supply at low currents causes it to operate at less-than-optimal efficiency, thereby in effect wasting power.

So, in the case of the aforementioned 2200 mA power supply, it may have a peak efficiency range up at 1600-1700 mA, thereby causing it to operate very inefficiently when only low output current (say 500 mA) is drawn. This problem is exacerbated when most of the devices actually plugged into the ports are low-draw devices; the system is designed to operate best at high draw conditions, but such high draw conditions may only occur a very small fraction of the time.

FIG. 1 is a block diagram illustrating a typical bus network configuration known in the prior art. A power supply 102 resident in a computerized device 100 (e.g., PC or laptop) receives electrical current through a power cable 101, for instance a 115 VAC 60 Hz cord. The power supply 102 is responsible for providing power directly or indirectly to the various components of the computerized device 100. These components may include inter alia a central processing unit (CPU) 106, a volatile memory device 104 (such as RAM, DRAM, eDRAM, SRAM, or 1T-SRAM), a non-volatile storage device 108 (such as ROM, PROM, EAROM, EPROM, flash memory, a hard disk drive or HDD, etc.), and a host controller 110. Other components (not shown) are powered by the power supply as well.

The host controller 110 may comprise e.g., a module, card or board having one or more ports 112 each adapted to receive a bus connector 114. The host controller assembly 110 typically slides into the backplane, main board, or motherboard of the computer 100. The host controller 110 is responsible for handling communications involving one or more devices 116 (e.g., serial bus devices), the CPU 106, and the RAM 104. The host controller also distributes power among the various devices 116 which connect to the host controller 110 through one of the ports 112. Usually, a cable 118 (e.g., serial bus cable) with one or more connectors 114 is used as the link for connecting up the device 116 to a corresponding port 112 on the host controller 110.

In order for the host controller 110 to achieve compliance with a certain bus standard (e.g., serial bus standard), the host controller 110 must be designed to satisfy a number of rules described within a target specification. For example, according to the latest USB specification, the host controller 110 is required to reserve 2.5 W of power (500 mA of current) per each port 112 comprised within the controller 110. Thus, in order to achieve compliance with a target standard, the minimum amount of current that the power supply 102 must budget for the serial bus network is number of ports 112 multiplied by the minimum amount of current required per each port (as taken from the specification). For example, in the n-port USB controller illustrated by FIG. 2, the power supply 102 must have (n×500 mA) of current exclusively allocated for USB.

Now suppose that one of the aforementioned 1100 mA serial bus devices is connected to the two-port system described above, while the power supply retains its 1000 mA budget for USB. In this situation, the user would not benefit in any appreciable manner from having a serial bus device capable of supporting up to 1100 mA of current. This is because the USB specification requires 500 mA to be reserved per each port, and in a two-port system, this leaves no current remaining which might otherwise be used for implementing desirable features such as the fast battery charge mentioned above.

Furthermore, existing prior art solutions are typically "hard set" so that each port has a fixed amount of power allocated thereto, with no mechanism for reallocation. Certain prior art approaches do have the ability for adjustment, but this is accomplished via a set of resistors (e.g., varistor) or other such components, and is effectively a one-time adjustment; it is impractical to adjust these components on a regular basis, and a user will generally not know how to accomplish this, let alone want to deal with the inconvenience of doing so.

Presently, there is no method or apparatus for enabling a serial bus device to operate outside of a governing serial bus specification, yet provide efficient and dynamically optimized operational characteristics. The prior art only loosely concerns itself with these issues.

For example, U.S. Pat. No. 7,219,180 to Frank issued May 15, 2007 entitled, "Combined uninterruptable power supply and bus control module to improve power management and legacy support" discloses a system and apparatus providing power management and legacy support. An uninterruptable power supply is combined with a bus control module. The bus control module provides legacy support through a single connectivity. The bus control module monitors and controls power distribution within the system. A bus hub unit is coupled to the bus control module and provides a plurality of ports to which bus functions may be coupled.

U.S. Pat. No. 7,194,638 to Larky issued Mar. 20, 2007 entitled, "Device and method for managing power consumed by a USB device" discloses a method and device for reducing an amount of power consumed by a USB device (such as a host/hub/peripheral device which may include a receiver, PHY, synchronizer, or other component associated with a data path) adapted to communicate using one or more USB signals each having a synchronization field. The method may include measuring a length of the synchronization field; associating a power down level for an idle mode based in part on the measuring operation; and disabling one or more portions of the receiver when the USB bus is inactive and/or when the USB device is transmitting data. In this manner, the one or more portions of the receiver are disabled (i.e., powered off or placed in a low power standby mode) during a times when the bus is idle or when transmitting, which can reduce the total amount of power consumed by the USB device.

U.S. Pat. No. 7,188,263 to Rubinstein et al. issued Mar. 6, 2007 entitled, "Method and apparatus for controlling power state of a multi-lane serial bus link having a plurality of state transition detectors" discloses a system including two or more electrical components that can be placed into two or more power consumption states. The arrangement can take advantage of existing circuitry to selectively disable certain state transition detectors to thereby provide additional power reduction.

U.S. Pat. No. 7,159,132 to Takahashi et al. issued Jan. 2, 2007 entitled, "USB device that provides power that is different from power prescribed in the USB standard" discloses a USB device for performing communications with a second device through a USB interface while supplying electric power to the second device through a power-source supplying line in the USB interface. The USB device includes a communication unit for communicating with the second device, a power source capable of outputting electric power of a voltage being different from a standard power voltage prescribed in the standards of the USB interface. The power source supplies the electric power to the second device through the power-source supplying line. The second device includes a low load unit and a high load unit. The power source supplies the electric power having a power voltage higher than the standard power voltage to the high load unit through the power-source supplying line.

U.S. Pat. No. 7,069,347 to Kolokowsky issued Jun. 27, 2006 entitled, "Device and method for adapting speed of a USB device based on available power" discloses a device and method for adapting an operating speed of a USB peripheral device coupled with a host. In one example, the peripheral device is initially operated at a first operating speed associated with a first power consumption level, and it is determined whether the host will support the peripheral device operating at a second, higher power consumption level. If so, the peripheral device is reconfigured to operate at a second operating speed associated with the second power consumption level. In another example, the peripheral device may be initially operated at an operating speed of approximately 12 Mbps (i.e., full speed USB) so that the peripheral device draws no more than approximately 100 mA of current. The peripheral device may report a high power descriptor set including a 100 to 500 mA descriptor, and if the host selects the descriptor set, then the peripheral device is can reconfigure itself to operate with an operating speed of approximately 480 Mbps (i.e., high speed USB) so that the peripheral device draws approximately 100 to 500 mA of current. In this manner, the peripheral device can selectively operate in high speed USB mode if the host (or hub) can provide the current needed by the peripheral device to operate at the faster data rates of the high speed USB mode. If not, the peripheral device operates in the full speed USB mode.

U.S. Pat. No. 7,024,567 to Kim et al. issued Apr. 4, 2006 entitled, "Electric power controlling method through a serial bus" discloses a method of demanding/supplying a necessary electric power through a self-adjusting process between two devices connected by a Universal Serial Bus (USB), removing the requirement of disconnecting and re-connecting cable lines in order to make a power demand again. A power supplying device first determines how much electric power is demanded by a demanding device, then sends the device a signal of impossible supply or the like if the demand can not be met. The supplying device also determines whether or not a new electric power demand can be supplied if the demanding device demands again, and the supplying device then supplies power to the demanding device if the demand can be met. A power demanding device demands an electric power from a supplying device connected through the USB. The connected power demanding device first reduces the demand if a signal of impossible supply or the like is received from the supplying device, then demands the reduced amount from the supplying device.

U.S. Pat. No. 6,996,727 to Snyder et al. issued Feb. 7, 2006 entitled, "Power supply for universal serial bus interface with programmable bus pullup resistor" discloses an apparatus comprising a power supply device configured to generate a voltage. The voltage may comprise either (i) a standard voltage level or (ii) a power down voltage level. The power down voltage level may be configured to reduce current consumption.

U.S. Pat. No. 6,087,804 to Suda issued Jul. 11, 2000 entitled, "Electronic apparatus using the power supply line of a serial bus, for supplying and providing power appropriately" discloses an electronic apparatus comprising a power supply controller, a power supply circuit, a battery, and a host controller, when power is supplied to the apparatus through an AC power supply line, the power supply controller causes the power supply circuit to supply power to the main section and battery of the apparatus and to the power supply line of a serial bus. When no power is supplied to the apparatus through the AC power supply line and power is supplied to the apparatus through the power supply line of the serial bus, the power supply controller determines the amount of power to be consumed by the main section of the apparatus and the amount of power to charge battery with, from the amount of power represented by data supplied from the host controller, which represents the amount of power the power supply line of the serial bus can supply. The power supply controller controls the power supply circuit in accordance with the amount of power thus determined. When no power is supplied to the apparatus through the AC power supply line or the power supply line of the serial bus, the power supply controller controls the power supply circuit to supply power from the battery to the main section of the apparatus.

U.S. Pat. No. 5,787,298 to Broedner et al. issued Jul. 28, 1998 entitled, "Bus interface circuit for an intelligent low power serial bus" discloses a low power, single master, variable clock rate, daisy-chainable, serial bus connects a bus dispatch (master) to a chain of one or more daisy-chained peripheral devices (slaves). The bus has a bidirectional serial data line, a bidirectional clock line, unidirectional interrupt line, power and ground lines. Each peripheral device includes a first bidirectional signal line, a second bidirectional signal line coupled to the bus clock and data lines, respectively, and an interface circuit coupled to the first and second bidirectional signal lines. The interface circuit includes a first buffer circuit coupled to the first and second bidirectional signal lines, and a second buffer circuit coupled to the first buffer circuit. A control circuit in the interface circuit couples the first and second buffer circuits where in a first mode of operation, the control circuit passes signals on the first and second bidirectional signal lines through the first and second buffer circuits, and in a second mode of operation, the control circuit passes signals on the first and second bidirectional signal lines through the first buffer circuit and configures the second buffer circuit to terminate the first bidirectional signal line. Thus bus power supply line is coupled to the interface circuit and a voltage on the power supply line is used to power the first and second buffer circuits and the control circuit. The bus interrupt line is coupled to the control circuit of the interface circuit. The interface circuit is also coupled to signal lines of the peripheral device.

So called "Powered USB" (or "USB PlusPower technology") is an alternative approach to providing power over a USB interface. As previously noted, traditional USB standards (e.g., USB 1.1, 2.0, etc.) allow peripheral devices to exchange data with and also to receive device power over the USB bus. This approach to power delivery is convenient, as it can obviate a power supply for each bus-powered peripheral device, as well as power strips, and more complex electrical infrastructure. As previously noted, however, the USB 1.1 and USB 2.0 protocols may limit bus supplied power to 2.5 Watts (0.5 A @+5V) per port (up to 500 mA). For higher power-draw devices such as printers or displays, existing USB power limits are often insufficient, requiring such peripherals to use an external power supply. This limitation significantly restricts the "plug-n-play" model conceived for USB peripherals. It also necessitates the use of other power-supplying equipment, such as power strips, wires, etc.

USB PlusPower (or powered USB) expands the USB 1.1 and USB 2.0 standards, increasing the maximum current and voltage for bus-powered peripherals. The USB PlusPower design provides several different voltage and current options: (i) +5 volts DC at up to 6 amps per connector (up to 30 Watts); (ii) +12 volts DC at up to 6 amps per connector (up to 72 Watts); and (iii) +24 volts DC at up to 6 amps per connector (up to 144 Watts). The USB PlusPower design provides a new cable design having two additional wire pairs inside the cable, and other elements to support the new current and voltage. However, the USB PlusPower as of the present time has no facility for dynamic power allocation or distribution across multiple ports; rather, it appears to merely raise the ceiling on power that can be supplied on a per-port basis.

Hence, despite the foregoing various approaches, there is a salient need for apparatus or methods for dynamically allocating current among a plurality of electrical ports. In the exemplary context of a serial bus, what is specifically needed is apparatus and methods for enabling a host controller to support multiple bus devices capable of drawing more power than what is required by a serial bus specification, yet at the same time, enabling a power supply to operate at or near its peak power efficiency (and be sized so as to avoid wasting power unduly, which can be critical for battery powered devices). Ideally, such apparatus and methods would be intelligent enough to dynamically and automatically allocate current as necessary, instead of requiring e.g., a user to toggle through a plurality of current settings adapted to accommodate one or more possible configurations of the serial bus system.

SUMMARY OF THE INVENTION

The present invention satisfies the foregoing needs by providing, inter alia, a apparatus and methods for dynamically allocating current among a plurality of electrical ports.

In accordance with a first aspect of the invention, an apparatus for dynamically allocating the distribution of the electrical power over the plurality of serial ports is disclosed.

In one embodiment, the apparatus is adapted for or use in a high-speed serialized bus protocol device having a plurality of ports capable of transferring both data and electrical power, and comprises: a first module adapted to determine an amount of electrical current drawn over a first portion of the plurality of serial ports; and a second module adapted to adjust an amount of current available to a second portion of the plurality of serial ports, the adjustment being based at least in part upon the amount of current drawn over the first portion of the plurality of serial ports.

In one variant, the first portion of the plurality of serial ports comprises one or more ports that are not part of the second portion of the plurality.

In another variant, the serial bus protocol comprises an IEEE 1394-compliant protocol, or alternatively a Universal Serial Bus (USB)-compliant protocol.

In yet another variant, the first module is adapted to perform the adjustment using at least a switch.

In still a further variant, the serial bus protocol device comprises a laptop computer, and the serial ports each are capable of being coupled to a portable device selected from the group consisting of: (i) a cellular smartphone; and (ii) a personal media device.

In a second aspect of the invention, a method of optimizing the power use characteristics within a first device having a power source useful for the supply of power to a plurality of second devices is disclosed. In one embodiment, the method comprises: placing a first one of the plurality of second devices in communication with the first device; determining the power requirements of the first one of the plurality of second devices; allocating power to the first one of the plurality of second devices based at least in part on the act of determining; and allocating power to others of the plurality of second devices when placed in communication with the first device, the allocating power to others being based at least in part on: (i) the allocating to the first one of the second devices, and (ii) a characteristic of the power source.

In one variant, the first device comprises a laptop computer, and the second devices each comprise a portable device selected from the group consisting of: (i) a cellular smartphone; and (ii) a personal media device.

In another variant, the characteristic of the power source comprises an efficiency-related parameter of the source; e.g., an output-versus-input efficiency metric or ratio. The act of allocating power to others based at least in part on the allocating to the first one and a characteristic of the power source optionally comprises: determining an optimal efficiency value or range for the power source; and allocating the power to others of the second devices so as to achieve the optimal value or range when the power allocated to the first one of the second devices is considered.

In yet another variant, the placing a first one of the plurality of second devices in communication with the first device comprises placing the first one in data and electrical power communication with the first device via a substantially unitary interface cable and associated ports of the first device and the first one of the second devices. The substantially unitary interface cable and associated ports of the first device and the first one of the second devices are optionally compliant with a high-speed serialized bus protocol such as universal serial bus (USB), or IEEE Std. 1394.

In a third aspect of the invention, an apparatus for regulating current delivered over a plurality of ports within an electronic device is disclosed. In one embodiment, the apparatus comprises: a first apparatus adapted to detect an amount of current drawn over a first of the ports; and a second apparatus adapted to adjust an amount of current available to a second of the ports based at least in part upon the amount of current drawn over the first port.

In one variant, the apparatus is adapted to interface with a host controller, such as an IEEE Std. 1394- or USB-compliant host controller.

In another variant, the electronic device comprises a power supply that has peak efficiency occurring at an output current that is below its maximum rated output current. For example, the power supply has peak efficiency occurring at an output of approximately 1600 milliamps (mA), and a maximum rated output of approximately 2200 mA.

In yet another variant, the second apparatus adapted to adjust an amount of current available to a second of the ports based at least in part upon the amount of current drawn over the first port is further adapted to maintain the total amount of current drawn by all of the plurality of ports at or proximate to the output current corresponding to the peak efficiency.

In a fourth aspect of the invention, a method of regulating current in a computerized device having a plurality of interfaces is disclosed. In one embodiment, the interfaces are further adapted to transfer power between the computerized device and one or more electronic devices, and the method comprises: detecting an amount of current provided to a first interface having a first of the electronic devices coupled thereto; communicating with the first electronic device so as to adjust the amount of current provided; and determining an amount of current provided to a second of the interfaces based at least in part upon the amount of current provided the first electronic device.

In one variant, both detecting the amount of current provided to the first interface and adjusting the amount of current provided to the first interface are performed by a host controller of the computerized device.

In another variant, the determining an amount of current provided to a second of the interfaces is based at least in part upon a per-interface threshold requirement (e.g., 500 milliamps).

In yet a further variant, the computerized device is in data and power communication with the first electronic device via the first interface and an interconnection cable having data and power pathways, and the act of communicating comprises sending a signal or message over a data or power pathway of the cable.

In a fifth aspect of the invention, apparatus for regulating current drawn via a plurality of ports of an electronic device is disclosed. In one embodiment, the apparatus comprises: a first module adapted to detect an amount of current drawn over a first port; and a second module adapted to adjust an amount of current available to a second port based at least in part upon the amount of current drawn over the first port.

In another embodiment, the apparatus comprises: a first module adapted to detect an amount of current provided to a first set of ports; and a second module adapted to adjust an amount of current provided to at least one port of a second set of ports. The adjustment is based at least in part upon the detected amount of current.

In a sixth aspect of the invention, a method of regulating current is disclosed. In one embodiment, the method comprises: detecting an amount of current provided to a first port; and adjusting an amount of current provided to a second port based at least in part upon the amount of current detected. In another embodiment, the method comprises: detecting an amount of current drawn by a first device; and adjusting an amount of current provided to a second device based at least in part upon the amount of current drawn by the first device.

In a seventh aspect of the invention, an improved computerized device adapted for dynamic power allocation is disclosed. In one embodiment, the apparatus comprises a laptop computer or other computer device that includes a plurality of serialized data ports (e.g., USB or 1394 ports). These ports can be used to interface data and power to e.g., portable mobile phones or media devices. In one variant, the dynamic power allocation is accomplished via a power controller operative to control power supplied to the various ports based on one or more factors such as the status or use of each of the ports. The functions of this controller may be, in various implementations, fully hardware controlled, hardware/software controlled, or fully implemented in software or firmware, depending on the level of functionality required.

In an eighth aspect of the invention, a computer-readable storage device is disclosed. In one embodiment, the storage device comprises a computer readable medium containing at least one computer program useful for dynamic power allocation over a plurality of ports of a host electronic device. In one variant, the storage device comprises a hard disk drive (HDD) and the host electronic device comprises a PC or other computerized apparatus. In another variant, the storage device comprises a volatile or non-volatile memory device.

In a ninth aspect of the invention, circuitry useful for the dynamic power allocation over a plurality of ports of a host electronic device is disclosed. In one embodiment, the circuitry is part of (or in communication with) host controller circuitry of the host device, and is adapted to determine the current requirements of various ports of that device and switch or provide current accordingly. In one variant, the circuitry comprises a plurality of discrete electronic components (e.g., inductors, resistors, transistors, op-amps, etc.). In another variant, the circuitry comprises one or more integrated circuits.

Other features and advantages of the present invention will immediately be recognized by persons of ordinary skill in the art with reference to the attached drawings and detailed description of exemplary embodiments as given below.

DETAILED DESCRIPTION OF THE INVENTION

Figure 1:
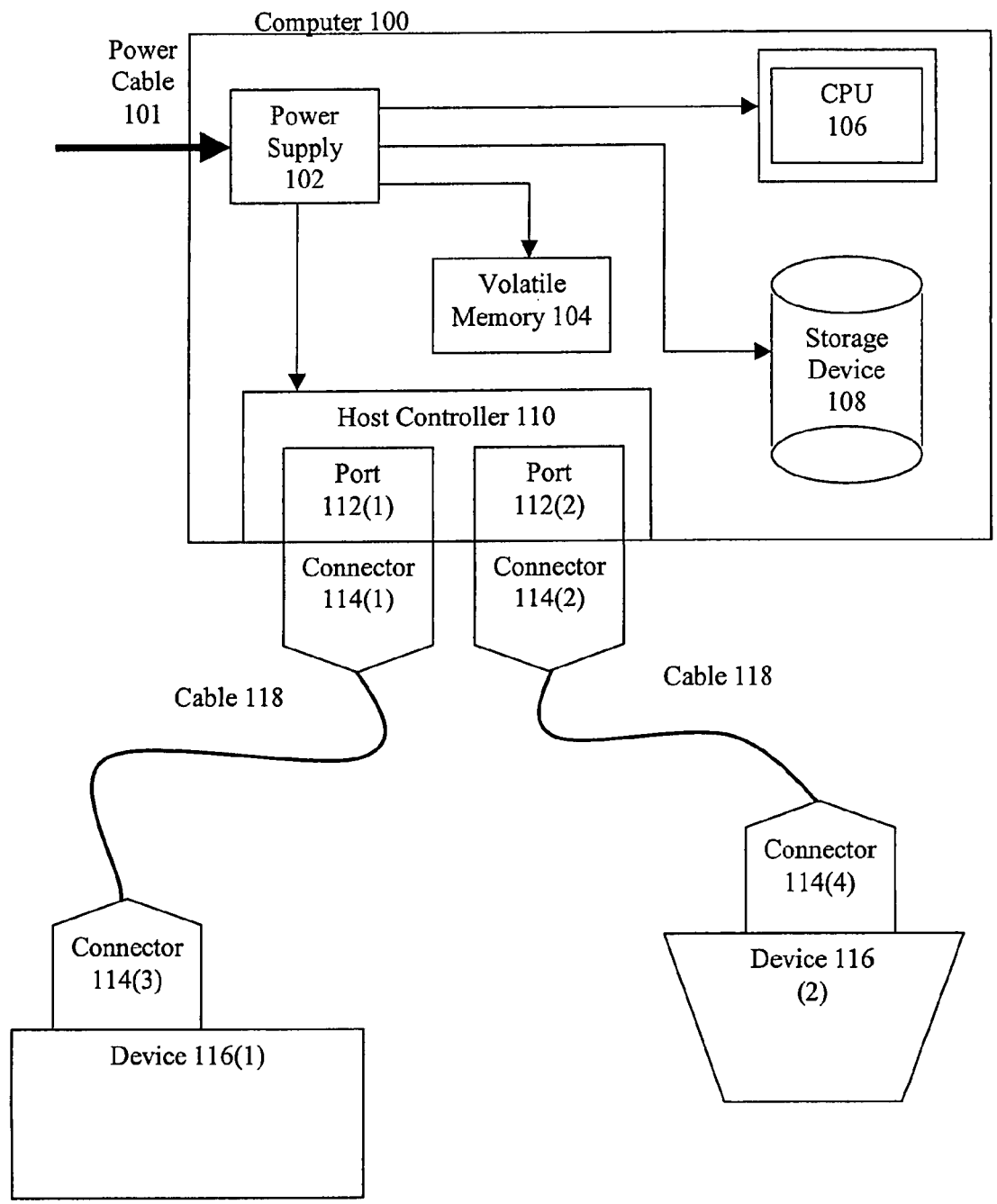
FIG. 1 is a block diagram illustrating a typical prior art device and network configuration.
Figure 2:
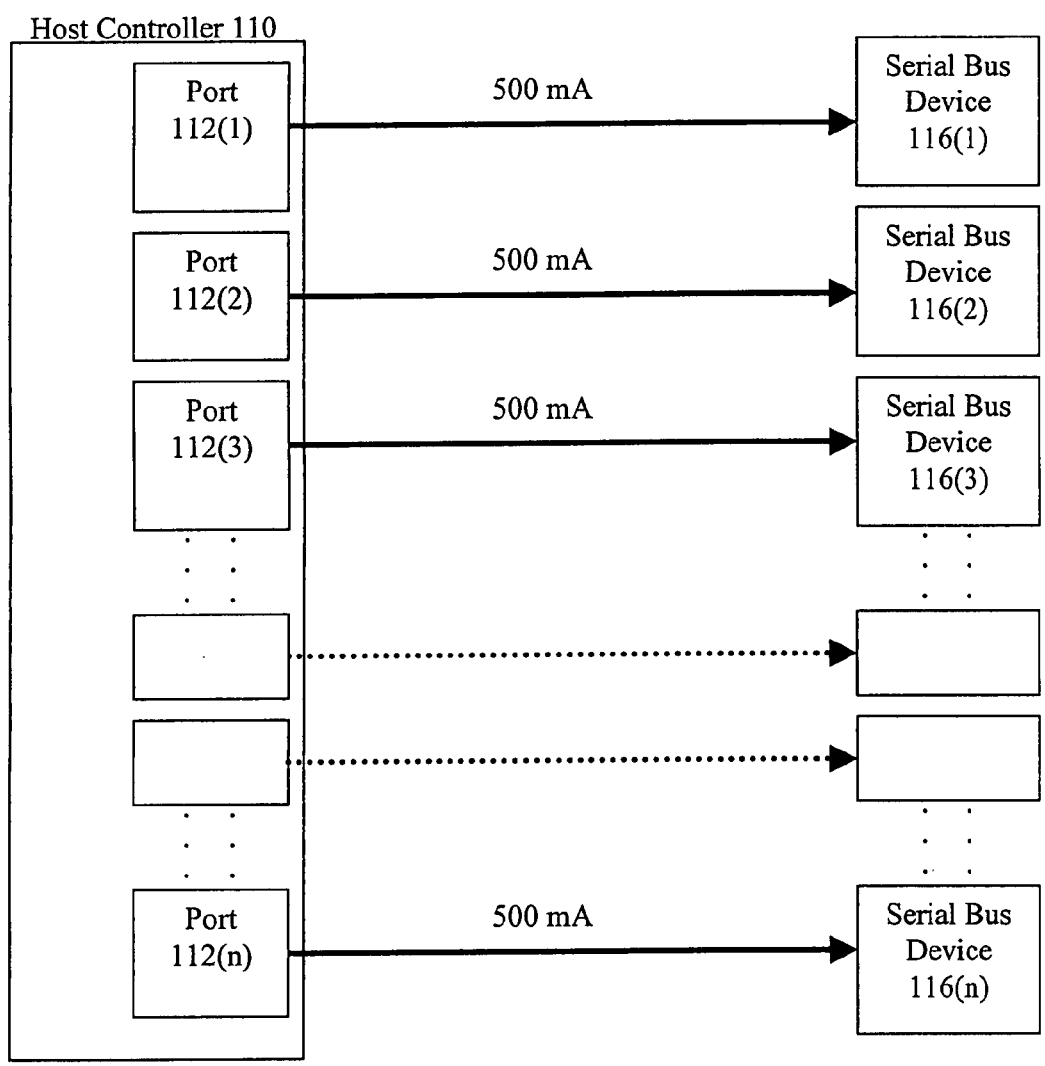
FIG. 2 is a block diagram illustrating various current reservation requirements for a typical prior art n-port USB-compliant host controller.

As used herein, the terms "client device" and "end user device" include, but are not limited to, set-top boxes (e.g., DSTBs), personal computers (PCs), and minicomputers, whether desktop, laptop, or otherwise, and mobile devices such as handheld computers, PDAs, video or still cameras, personal media devices (PMDs), such as for example an iPod™, and smartphones (e.g., iPhone™), or any combinations of the foregoing.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (BREW), and the like.

As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, ROM), digital processors, SoC devices, FPGAs, ASICs, ADCs, DACs, transceivers, memory controllers, and other devices, as well as any combinations thereof.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the terms "network" and "bearer network" refer generally to any type of data, telecommunications or other network including, without limitation, data networks (including MANs, PANs, WANs, LANs, WLANs, micronets, piconets, internets, and intranets), hybrid fiber coax (HFC) networks, satellite networks, and telco networks. Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, 802.11, ATM, X.25, Frame Relay, 3GPP, 3GPP2, WAP, SIP, UDP, FTP, RTP/RTCP, H.323, etc.).

As used herein, the term "network interface" refers to any signal, data, or software interface with a component, network or process including, without limitation, those of the Firewire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), WiFi (802.11a,b,g,n), WiMAX (802.16), PAN (802.15), or IrDA families.

As used herein, the term "poll" or "polling" refers to, without limitation, and communication, signal, action, or query which either elicits a response from a device, or by which information can be obtained from such device.

As used herein, the term "serial bus" refers without limitation to any bus or other data transfer, transmission, receipt, or interface structure adapted to operate according to a serialized protocol. Examples of such serialized protocols include the USB (universal serial bus) protocol, USB 1.1, USB 2.0, USB On-The-Go, "powered USB", etc., IEEE Std. 1394 (e.g., 1394a, 1394b), and so forth.

As used herein, the term "wireless" means any wireless signal, data, communication, or other interface including without limitation Wi-Fi, Bluetooth, 3G, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Overview

In one salient aspect, the present invention provides methods and apparatus for dynamically allocating current to one or more devices of an electronic system. This dynamic allocation approach in effect lets an electronic device providing power to others do "more with less", in that it can adjust for situations where more than just a baseline or minimum current is needed, yet still maintain a comparatively lower-capacity power supply to service such needs. It also advantageously permits the efficiency characteristics of the power supply to be considered and optimized if desired.

In an exemplary embodiment, the power-providing and receiving devices communicate via a serial bus (and associated protocol, such as USB or FireWire), and the methods and apparatus are adapted to detect how much current is presently being drawn by a first set of one or more ports, and distribute remaining current among a second set of ports according to e.g., a prescribed rule or scheme. For example, such a rule or scheme might impose the restriction that only one port of a two-port device can supply a higher power level (e.g., 1100 mA), and the other port a lower level (e.g., 500 mA), such that when an 1100 mA device is plugged into one of the ports, the other port is automatically restricted to the lower level. Hence, an exemplary 1600 mA power supply can supply the needs of an 1100 mA connected device irrespective of which port it is plugged into, just not two at the same time.

Alternatively, with an exemplary 2200 mA power supply previously described that has a peak efficiency at about 1600 mA output, the foregoing allocation rule (1100/500) would help maintain the power supply in its peak efficiency range.

In an exemplary embodiment, a controller (e.g., power controller or host controller) is responsible for determining how much current is presently being drawn by the first set of (one or more) ports, and allocate the remaining current (or portions thereof) in order to achieve a desired objective. Additionally, the controller apparatus may be adapted to identify the minimum amount of current required to be reserved for all ports of the system, and to distribute any remaining current among these ports in accordance with a specified protocol or allocation scheme. In some variants, this protocol or scheme comprises distributing the excess current evenly across all of ports of the controller.

In other variants, the protocol utilizes a set of priorities such that devices with greater priorities are serviced before devices with lesser priorities. This approach may also include minimum "floors" or maximum "ceilings" for each device, such that no particular device is completely starved (or conversely over-allocated).

In still other variants, the allocation protocol is governed at least in part by temporal considerations, such as the time that certain devices are detected to be active across a certain port.

In any of the aforementioned variants, the protocol may additionally be based on the capacity of one or more serial bus devices to draw more current than the maximum amount required by the controlling serial bus specification.

The aforementioned protocol may also optionally be governed at least in part by one or more user selections. In this manner, a user can tailor the behavior of the adjustable port power switch according to his or her own specific preferences, and/or the prevailing operational considerations at that time. This can be implemented in a variety of ways including, inter alia, by one or more user interfaces (e.g., display windows, icons or menus, and/or physical switches or buttons accessible to the user).

Other embodiments comprise an apparatus and methods adapted to loop through each device directly connected to the host controller, identify the minimum amount of current required by the device, and provide such current accordingly. Subsequently, the apparatus distributes any remaining current among the devices according to a specified protocol (such as for example any of the protocols detailed above, or combinations thereof). An advantage of the foregoing embodiment is that the underlying logic controlling the current distribution can be agnostic to the number of ports associated with a given controller, allowing for a universal design of the apparatus, thus allowing for the adjustable port power controller to be substantially independent of the host controller.

Exemplary embodiments of the power controller/switch of the invention may also be configured to instruct connected devices on their power consumption limits and habits, such as signaling an increased ceiling to connected devices that would otherwise only draw a lower amount of current.

Advantageously, the power controller/switch functionality of the present invention may be implemented (depending on the complexity of its functions) in anything ranging from very simple discrete hardware (e.g., resistors, capacitors, transistors, etc.) to sophisticated integrated circuit devices (e.g., microcontrollers, DSPs, ASICs, FPGAs, etc.) with algorithms running thereon.

Detailed Description of Exemplary Embodiments

Exemplary embodiments of the present invention are now described in detail. While these exemplary embodiments are described primarily in the context of a USB-compliant serial bus network, the invention is in no way limited to USB networks, high-speed data networks, or serial bus protocols. Generally speaking, the present invention may be used inter alia in any multi-port system where the total amount of power desired to be provided is different than the sum of all of the maximum amounts of power capable of being drawn from each port of the system. Thus, the invention may also be adapted for use with other high-speed serial bus networks (such as IEEE Std. 1394 compliant networks, also known as "FireWire" networks), as well as certain multi-port systems used for telecommunications, broadcasting, power distribution, manufacturing, medical devices, and other industrial uses. For example, an IEEE Std. 802.3af "Power over Ethernet" or PoE implementation of the type well known in the telecommunication arts may benefit from the various aspects of the invention.

It may also feasibly be used with wireless power transfer systems (e.g., inductive or capacitive) now becoming available on the market. Myriad other applications are also possible.

Figure 3:
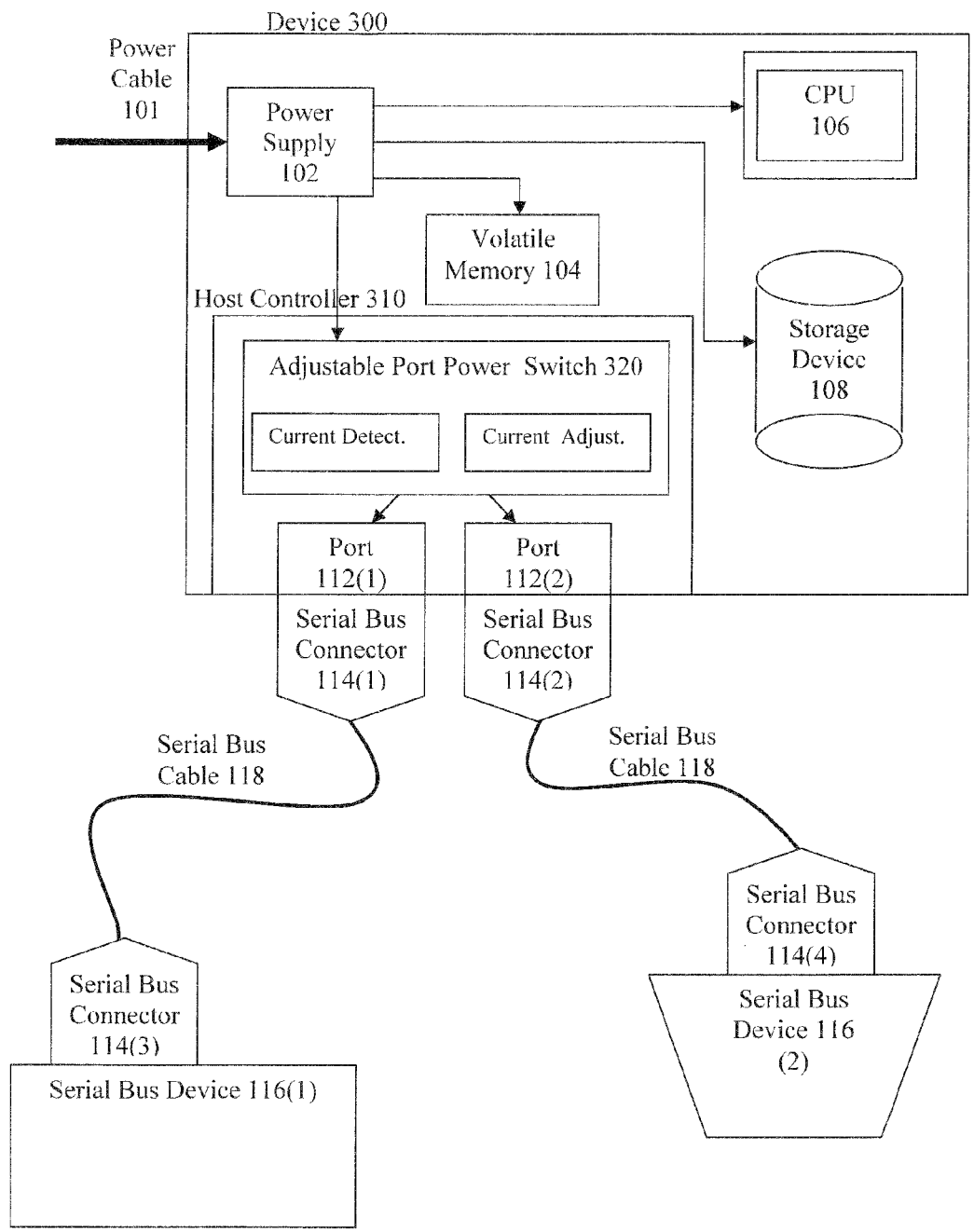
FIG. 3 is a block diagram illustrating a computerized device having an adjustable port power controller (e.g., switch) in accordance with a first embodiment of the present invention.

FIG. 3 is a block diagram illustrating an adjustable port power controller (e.g., switch) 320 used in a computerized electronic device 300 (e.g., end-user or client device) in accordance with one embodiment of the present invention. In some variants, the adjustable port power controller 320 comprises a first module adapted to detect an amount of current drawn by a first set of ports 112 of the (host) controller 310, and a second module adapted to distribute remaining current to a second set of ports 112 of the controller 310 according to one or more "rules". For example, as previously described, one port of a two-port device can supply a higher power level (e.g., 1100 mA), and the other port a lower level (e.g., 500 mA), such that when an 1100 mA device is plugged into one of the ports, this action is sensed by the first module, the other port is automatically restricted to the lower level by the second module. With the exemplary 2200 mA power supply previously described that has a peak efficiency at about 1600 mA output, this rule would help maintain the power supply in its peak efficiency range.

In other embodiments, the first and second module functions are combined into one logical process, module or hardware circuit. One or both of these modules may be implemented as circuits within the host controller 310 itself, such as in the form of an integrated circuit (e.g., microcontroller, digital processor, ASIC, etc.), or alternatively, as external devices or boards, cards, or plug-in or wireless modules that directly or indirectly interface with the host controller 310. Standard electrical/electronic components well known in the art (resistors, capacitors, inductors, transistors, inductive reactors or "choke coils", op-amps, etc.) may also be used to implement one or both of the aforementioned modules.

It will also be recognized that one can also reduce or scale back the physical size of the power supply if desired. For example, instead of utilizing a 2200 mA design with 1600 mA peak efficiency, a 1600 mA design having a peak efficiency at or near 1600 mA can be employed. This difference in peak output power allows for a physically smaller device to be used, which may be a critical attribute for inter alia laptop computer or portable devices where space and/or weight savings are highly desirable.

The term "switch" as used herein is intended in a general sense; i.e., a structure or process which alters a function between two or more possible states. For example, in one simple embodiment, the aforementioned switch may comprise a simple current limiting switch for each of the two ports; when a higher current device is plugged into one port, a switch associated with the second port is activated so as to limit current to that second port, and vice versa. Myriad other implementations (switched-based or otherwise) for the aforementioned controller function 320 are possible consistent with the present invention.

Moreover, an integrated power controller or switch which allows for selectively "dialing" the current via software or firmware, such as for example in the context of an I²C or SPI device, may be used consistent with the invention. As is well known, I²C is a multi-master serial computer bus that is used to attach low-speed peripherals to e.g., a motherboard, embedded system, or cellphone. I²C uses only two bidirectional open-drain lines, Serial Data (SDA) and Serial Clock (SCL), pulled up with resistors.

Similarly, the Serial Peripheral Interface Bus or SPI bus is a synchronous serial data link standard that operates in full duplex mode. Devices communicate in master/slave mode where the master device initiates the data frame. Multiple slave devices are allowed with individual slave select (chip select) lines.

In the case of an on-board or integrated adjustable port power controller/switch 320, as according to certain variants of the invention, the host controller 310 is designed to operate specifically with the number of ports present within that host controller 310, while having information regarding the minimum amount of current required per each port 112. All or portions of this functionality may be "hard-wired" directly into the controller circuit (such as based on a current value that is taken from the target serial bus or other specification). One advantage of this design is that the controllers are simpler to manufacture, since they generally require less board space and fewer components than the port-agnostic embodiments (as discussed below). In many embodiments, the logic underlying the first or second modules is substantially reduced, while in other embodiments, the first module is omitted entirely. However, such embodiments also place limitations on the flexibility and configurability of the application of power controller functions.

Figure 4:
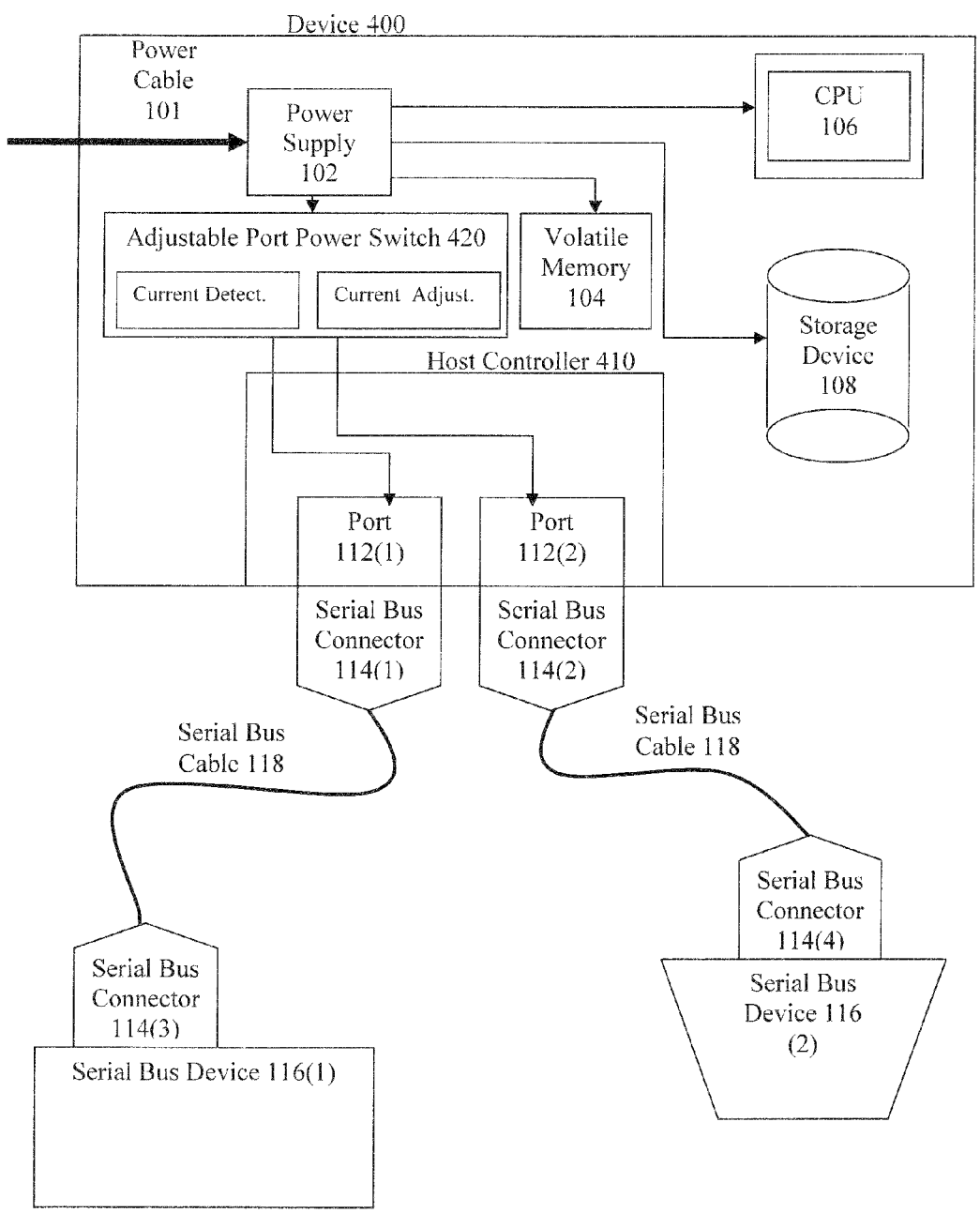
FIG. 4 is a block diagram illustrating a computerized device having an adjustable port power switch in accordance with a second embodiment of the present invention.

FIG. 4 is a block diagram illustrating an adjustable port power controller 420 in accordance with another embodiment of the present invention. In this embodiment, the adjustable port power controller 420 is substantially external to or discrete from the host controller 410 within the device 400. In some variants, the controller 420 comprises a board, card, or plug-in/wireless module that directly interfaces with the host controller 410, or another separate card. In other variants, the controller 420 comprises a discrete component that is mounted separately within its own physical space within the parent device 400.

A significant advantage of the configuration of FIG. 4 is that the adjustable port power controller/switch 420 may operate universally among a number of different types of host controllers 410. Additionally, the adjustable port power switch 420 can optionally remain agnostic to the number of ports present on a given host controller 410. For example, the same adjustable port power switch 420 that operates with a 2-port host controller 410 created by manufacturer A will also interoperate with a 4-port host controller created by manufacturer B (not shown). Furthermore, the fact that a user can now retain the adjustable port power switch 420 upon replacement of the host controller 410 will often times save the user money when upgrading his system or replacing defective or obsolete components. This is because the costs traditionally imputed to the switch 420 will not have to be replicated with the purchase of each new host controller 410. This is particularly beneficial in applications where a larger number of host controllers are utilized (i.e., in conjunction with one power switch 420). For example, in certain variants of the invention, the adjustable port power switch 420 is adapted to accommodate multiple host controllers 420 simultaneously. These variants are particularly useful for computer systems (e.g., PCs, servers, etc.) requiring more serial bus ports than that provided by a single serial bus card. In some variants, the same adjustable port power switch 420 can accommodate controllers used in separate serial bus networks, such as one or more IEEE Std. 1394-compliant host controllers and one or more USB-compliant host controllers.

Figure 5A:
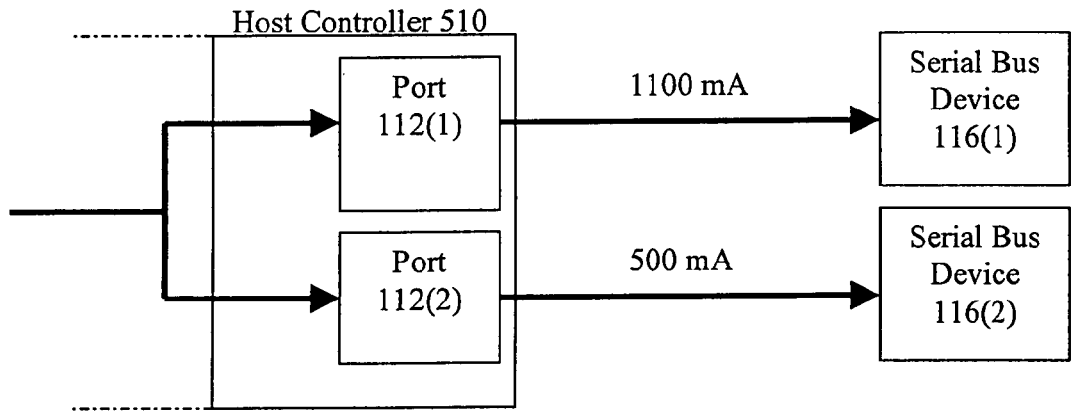
FIG. 5A is a block diagram illustrating a first configuration of a serial bus network in accordance with one embodiment of the present invention.
Figure 5B:
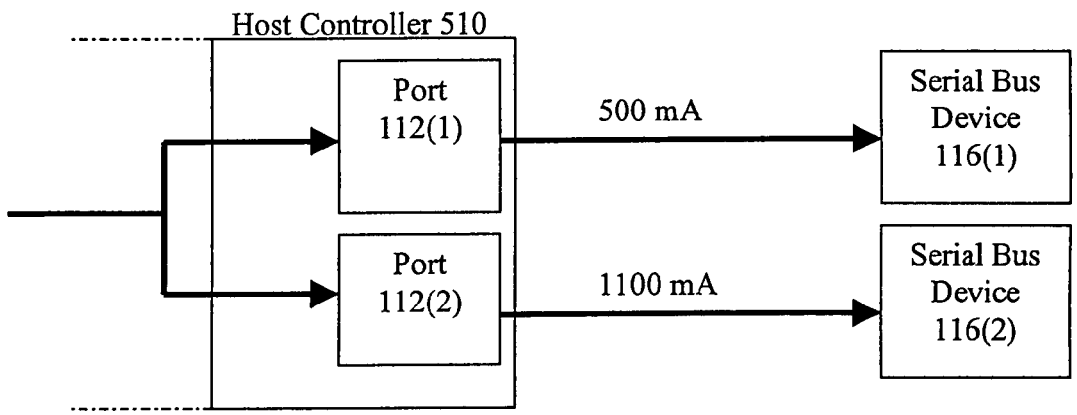
FIG. 5B is a block diagram illustrating a second configuration of a serial bus network in accordance with the embodiment illustrated by FIG. 5A.
Figure 5C:
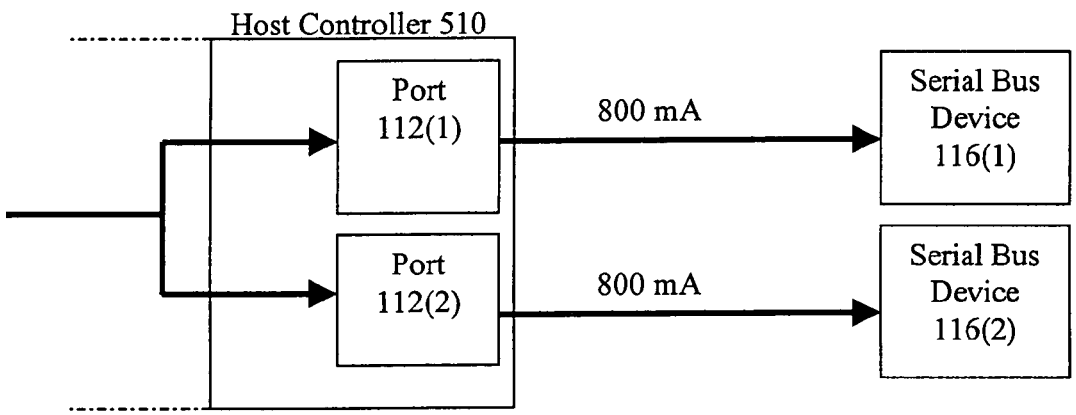
FIG. 5C is a block diagram illustrating a third configuration of a serial bus network in accordance with the embodiment illustrated by FIGS. 5A and 5B.

FIGS. 5A-5C are block diagrams illustrating various configurations of another embodiment of the present invention. In each of these figures, the host controller 510 comprises a 2-port USB compliant controller adapted to receive current (e.g., 1600 mA) from the adjustable port power switch (not shown). As mentioned above, the prevailing USB specification requires that the host controller 510 reserve at least 2.5 W of power (500 mA of current) per each of its ports 112. Thus, in the embodiment depicted by FIGS. 5A-5C, a total of 1000 mA of current is required by the USB specification, while an additional 600 mA of current is available which might be used to exceed the USB specification requirements.

The adjustable port power switch 320, 420 (not shown in FIGS. 5A-5C) may be adapted to distribute the additional 600 mA of current in any number of ways. For example, all 600 mA of current may be distributed to across port 112(1) (as shown by FIG. 5A), or completely across port 112(2) (as shown by FIG. 5B). Alternatively, the 600 mA of current may be split among the ports evenly (as shown by FIG. 5C). The allocation may also be based on the needs of the first port used; e.g., such as where the first device plugged into a port draws 1000 mA, and the remaining 600 is allocated to the other port if/when it is used. An 1100 mA ceiling might be imposed in this case; i.e., to assure that the 500 mA minimum for the second port is observed.

Myriad other allocations are also possible. Note that in each of these figures, the current is distributed dynamically by the adjustable port power switch 320, 420 such that the various configurations of current distribution are adapted to change as the needs of the system change.

According to certain embodiments of the invention, a protocol (e.g., such as one implemented by a computer algorithm running on the controller 320, 420) is used to govern the allocation or distribution of current. In one variant, the protocol comprises assigning priorities to all serial bus devices 116 connected to the controller 510. In this manner, devices with greater priorities may be serviced before devices with lesser priorities. These priorities may be based on one or more of any variety of different criteria, such as for example: (i) which device(s) is/are currently active (e.g., not in a sleep, power-down, or other such mode); (ii) which device(s) is/are currently charging their battery (if any); (iii) what the "seniority" of each device is in terms of how long it has been connected to the host; (iv) proximity of the then-existing level of battery charge in relation to a given threshold (e.g., the devices that have a lower remaining charge are prioritized so as to not chancing running out of electrical power); (v) integrated current draw for each device over a prescribed interval; and so forth.

In other embodiments, the protocol turns on temporal considerations. For example, in one variant (previously discussed), devices 116 are serviced on a first come, first serve basis. Thus, if no device is detected on port 112(1), and one device 116(2) is detected on port 112(2), then the device 116(2) is allocated the additional 600 mA of additional current. This rule may be modified by the serial bus controller 510 as it detects additional devices 116 active over a given port 112 (for example, as 112(1)), or it may be modified as the needs of a device become satisfied (for example, a device to port 112(2) finishes charging its batteries).

One or more operating efficiency considerations relating to the power supply 102 may also be used as a basis for power allocation or prioritization of ports. As previously discussed, the typical power supply will have an optimal efficiency point or range, wherein it would be desirable to operate. For a high-output power supply, this peak may fall at or near the maximum output (current) of the power supply. Hence, one embodiment of the invention uses information regarding this operating efficiency peak or range (e.g., a power supply "profile") in the determination of power allocation. This information may be obtained for example by pre-programming the power controller 320, 420 or host controller 310, 410 with data regarding the power supply characteristics, by utilizing a "smart" power supply which generates this information and sends it to the relevant controller(s), or via simple hardware/circuitry that is tuned to make use of, or alternatively senses power supply efficiency (e.g., output current versus input current, or the like). Myriad other approaches of providing such information may be used consistent with the invention.

In one variant, the aforementioned efficiency profile data is used by the power controller algorithm to control the power allocated to individual ports (and all the ports served by that supply collectively) so as to maintain the power supply in its optimal efficiency range. This may comprise for example allocating greater power to one or more ports, such as to permit increased battery charging rate, when excess (unused) power is available.

As part of the "intelligence" functions implemented by the various embodiments of the power controller, communications between the power controller 320, 420 (and/or host controller 310, 410) and the connected device(s) may be required. For example, in one variant of the invention, the power controller utilizes a device-specific or standardized communications or signaling protocol to communicate commands or other information to the connected device. Such devices may be, e.g., programmed to obey the USB prescribed current of 500 mA, and not exceed this value (since it does not know if the host device has ports which can exceed this amount). Using signaling from the power controller or host that is in a protocol recognized by the powered device, the device may adjust its internal operating rules, such as to permit use of higher current values for inter alia, faster battery charging. Such capability has great utility for among others portable battery powered devices, since they typically will have the most critical power needs. Hence, the exemplary embodiment of the power/host controller of the present invention can be configured to: (i) detect whether the powered device is portable/battery-powered; and if so, (ii) communicate with the device to raise its current draw limitations (if any) so as to charge the battery faster.

As a simple illustration in the context of the previous example, if such a battery-powered portable device is plugged into one port of the two-port device with a 2200 mA power supply having optimal efficiency at 1600 mA total output, then that device (which would typically limit itself to 500 mA) may be "uprated" via the aforementioned communication or other means to say 1100 mA, thereby reserving the final 500 mA (1600 mA minus 1100 mA) for the unused second port. In this fashion, the battery-powered device can be charged at a higher rate than that afforded by the 500 mA ceiling it would have otherwise imposed, and the power supply can operate closer to its peak efficiency point.

It will also be appreciated that the aforementioned "uprating" (or downrating conversely) may be performed in a progressive or incremental fashion, such as in 100 mA increments somewhat akin to the prevailing USB specification. These uprate/downrate instructions can be altered or changed as a function of time and/or other operating conditions as well, such as where the portable device battery is nearly fully charged, other battery-powered devices are plugged into other ports, etc.

It will be recognized that the status of the host device's power supply 102 and/or charge status may also be considered as part of the power allocation processes described herein. For example, where the host comprises a battery-powered portable device itself (such as for example a laptop computer), the laptop power supply may be fed from an external (e.g., 115 VAC) line, or alternatively float on the laptop's internal battery. In the latter case, source power is not unlimited, and in fact may be severely limited (such as where the laptop battery is at a very low state of charge). Plugging another battery-powered portable client device (e.g., an exemplary iPod™ or iPhone™) into a port on the laptop may, without proper controls, unduly burden the laptop battery for the benefit of accelerated charge of the client device. Hence, the present invention further contemplates placing restrictions on the amount of current a port (or set of ports) can draw based on the status of the host device power source. Even though peak efficiency for the power supply 102 may be at 1600 mA (of a total 2200 mA), it will still consume more power at 1600 mA than it would at 1000 mA, even though the latter is at less efficiency. Stated differently, there may be more power loss at higher load.

Figure 6:
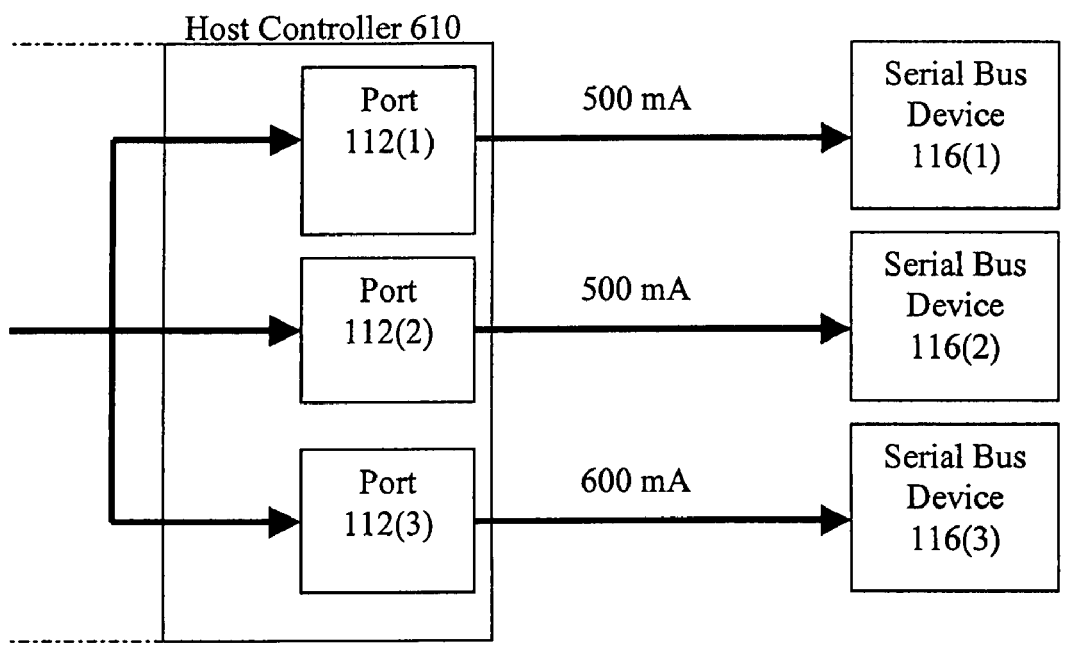
FIG. 6 is a block diagram illustrating a first configuration of a serial bus network in accordance with one embodiment of the present invention.

FIG. 6 extends the foregoing concept to a 3-port serial bus system. In a 3-port system, the exemplary USB specification requires a total of 1500 mA of current reserved per each port, which leaves only 100 mA available (assuming a 1600 mA supply) for exceeding the requirements of the specification. As described with respect to FIGS. 5A-5C, this excess current may be distributed in any number of ways (for example, completely to port 112(3) as shown by FIG. 6).

Figure 7:
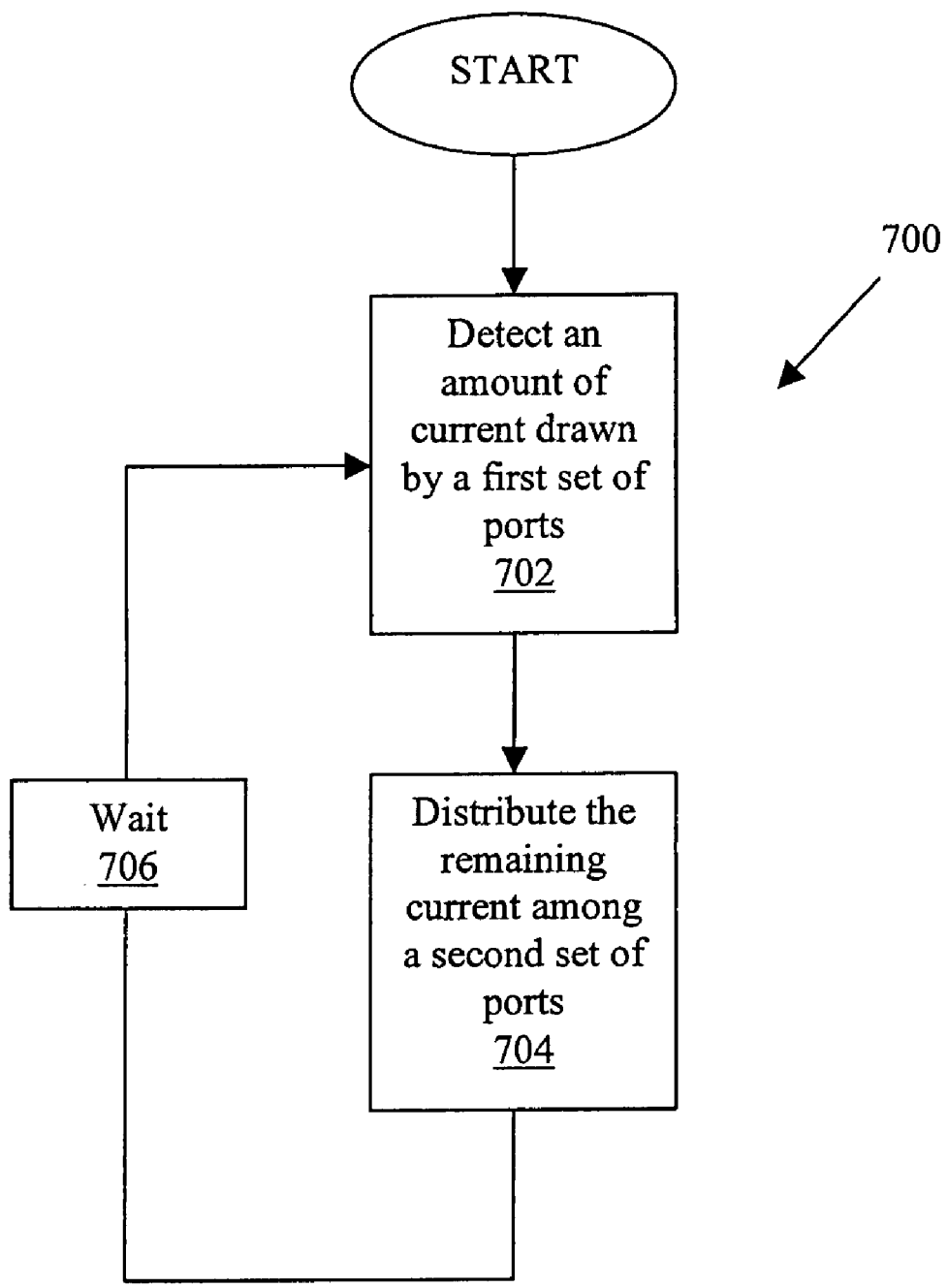
FIG. 7 is a logical flow diagram illustrating a first method of distributing current as per one embodiment of the present invention.

FIG. 7 is a logical flow diagram illustrating a first embodiment of a method 700 of distributing current per the present invention. At step 702, an amount of current drawn by a first set of ports is detected. As used in this context, the term "set" may refer to one or more ports. At step 704, the remaining current is distributed among a second set of ports (note that the first and second sets of ports may also include one or more ports that are common to both sets). The method then loops to step 702 (via, e.g., an optional wait state 706), and the process repeats.

Figure 8:
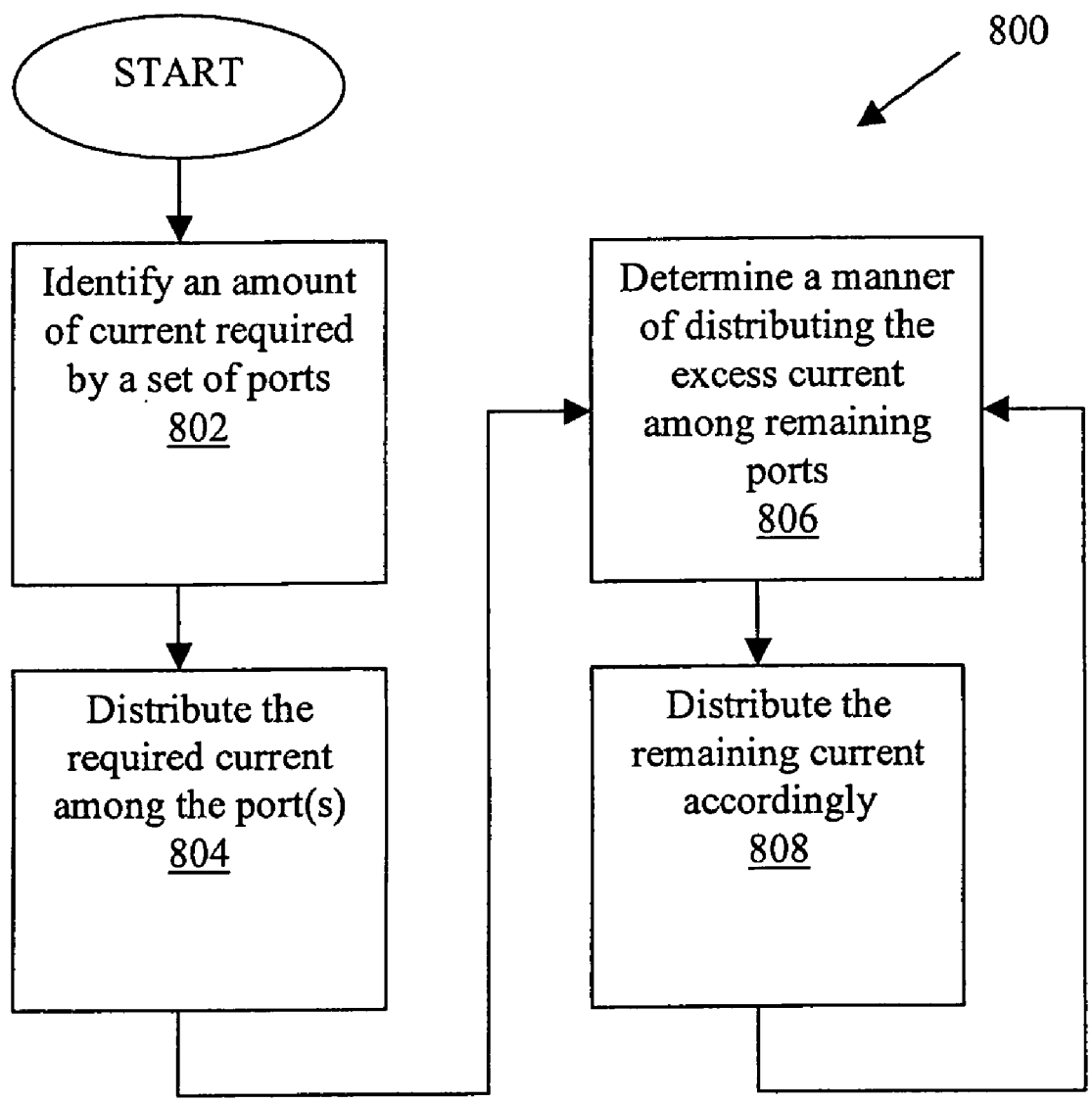
FIG. 8 is a logical flow diagram illustrating a second method of distributing current as per one embodiment of the present invention.

FIG. 8 is a flow diagram illustrating a second method 800 of distributing current according to another embodiment of the present invention. At step 802, an amount of current required by a set of (one or more) ports is identified. This amount may be predetermined or otherwise known by the allocation controller (e.g., based on device type or sensed data), or provided via communications from one or more electrical devices, such as a host controller 310, 410 or serial bus device 116. At step 804, the required current is distributed to the devices in accordance with the requirements of step 802. At step 806, a manner or scheme for distributing excess current among the ports is determined. In one embodiment, this scheme is determined by a set protocol (as discussed above with respect to FIGS. 5A-5C) which is e.g., programmed into the controller logic, or hard-wired into a circuit. In some embodiments, this protocol may be based at least in part upon a user's input to one or more user interfaces (e.g., display menus or icons, software "switches", physical (hardware) switches or buttons, etc. that are implemented by the host controller 310, 410. Finally, at step 808, the remaining current is distributed according to the scheme. All or portions of the method may then be repeated; for example, a new determination of the "required" power per step 802 may be performed, or alternatively only the allocation of excess current performed (via steps 806 and 808).

In yet another embodiment (not shown), the power controller 320, 420 may employ a statistical algorithm for distributing power or current. For instance, in one embodiment, a statistical "multiplexing" algorithm is employed via, e.g., a computer program running on the controller 310, 410 that allocates available power according to a statistical distribution. As is well know, statistical multiplexing allows for inter alia the servicing of multiple channels of "demand" whose peaks may, if considered collectively, exceed the total capacity of the system, but when considered on a statistical basis, do not exceed such capacity. Hence, the power consumption or current demand/requirement profiles of individual devices may vary significantly over time, yet when considered in the statistical aggregate, they do not exceed the power-providing capability of the source(s).

The foregoing statistical approach is typically suited to larger numbers of ports/devices, since the statistics of the port/device "pool" become better as the number increases. For example, in one variant, a single power controller (switch) 310, 410 comprises a DSP or other such processor comprising a statistical algorithm running thereon, and a larger number (e.g., 10) individual ports/devices across which power is to be allocated. Current/demand profiles for the devices are monitored, and optionally used as inputs to the statistical algorithm for allocating power as a function of time. In this fashion, the power allocation is dynamic and adaptive to changing statistics for the individual ports/devices. Other statistical approaches may be used with equal success as well. The foregoing statistical approach may have utility in the context of, e.g., Power over Ethernet (PoE) applications compliant with IEEE Std. 802.3af where a large number (e.g., 48 or 96) RJ45 connectors may require varying degrees of power over time, whether as part of a "PD" or "PSE". Moreover, designs which have sufficient margin to handle worst-case demand scenarios may find this approach useful.

Figure 9:
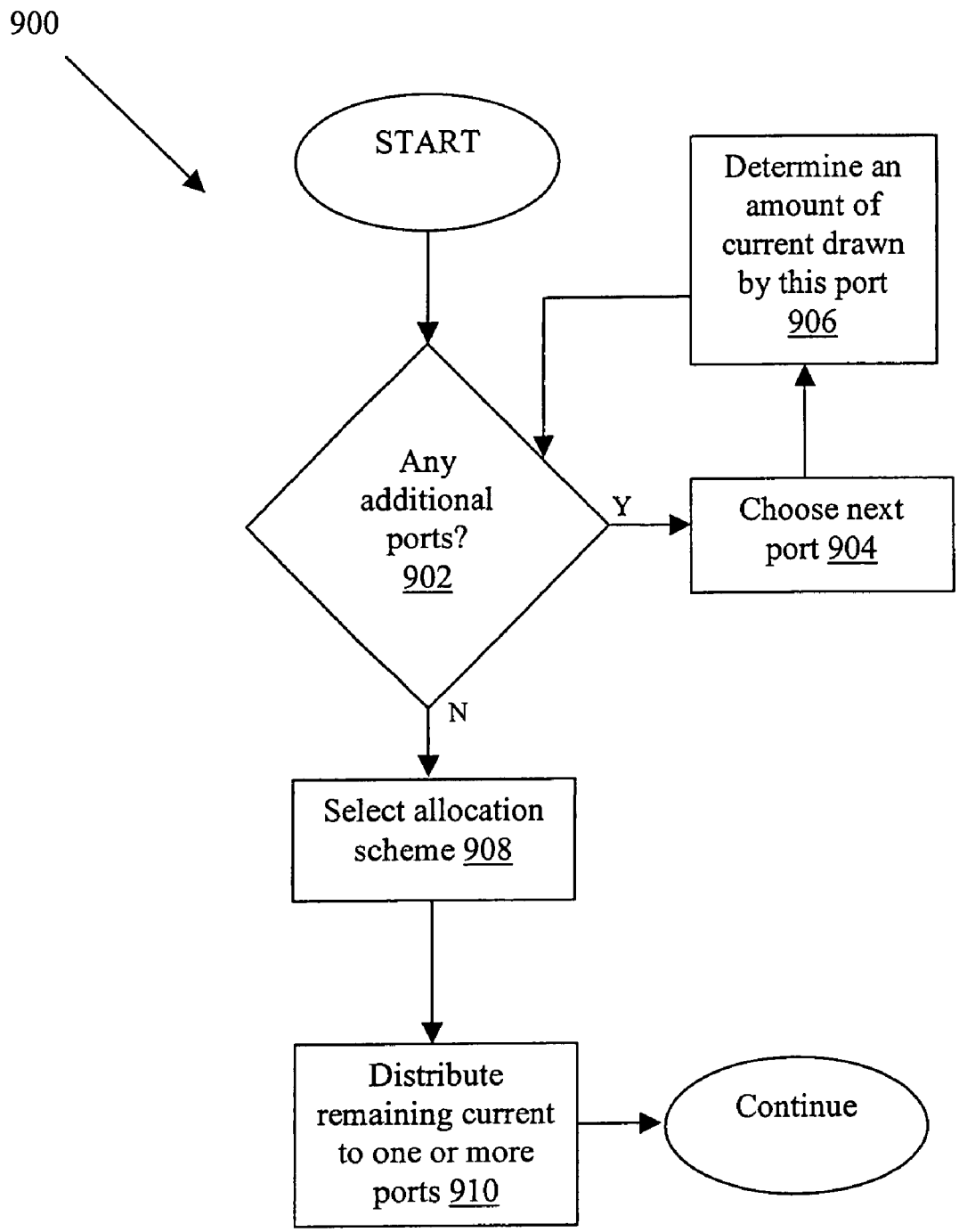
FIG. 9 is a logical flow diagram illustrating a third method of distributing current as per one embodiment of the present invention.

FIG. 9 is a flow diagram illustrating a third method 900 of distributing current according to another embodiment of the present invention. At steps 902 and 904, the next port 112 (i.e., that which has not yet been considered in the allocation analysis) is selected for examination. For example, this "next" port would comprise the first port 112 if the method 900 was executing a first iteration). At step 906, the amount of current drawn or required by the selected port is then determined.

Steps 902-906 repeat until the amount of current drawn or required by a set of ports of the host controller 310, 410 is finally determined. In one embodiment, the set of ports considered in this process comprises all ports of the host controller. Alternatively, logically related or unrelated (e.g., random) subsets thereof can be chosen for processing.

When there are no more selected ports remaining to consider, the method proceeds at step 908, wherein an allocation scheme is selected. Such selection may comprise simply accessing a file or register within the device (or even a hard-wired selection circuit) to identify the then-selected mode. For instance, in one variant, the user of the host device 300, 400 (e.g., a PC or laptop) is provided with a small software utility (application) which allows them to select a power allocation scheme (or simply preferences, the selection of which automatically determine the appropriate scheme). For instance, the user may be given the ability to set persistence or delay time before entering a low-power or "sleep mode" of operation after no activity has been sensed. Alternatively, the user might be given the option of battery charging modes; e.g., "charge at all times when connected", or "charge only when device not in use".

These preferences or selections are then loaded into one or more registers within the power or host controller processor as applicable that is accessible by the allocation algorithm during operation. The relevant allocation scheme is then selected accordingly by examining the contents of the register (s), and matching this to a predetermined scheme within the algorithm. Myriad other approaches for implementing such functionality are well known to those in the computer arts, and accordingly not described elsewhere herein.

Alternatively, the selection process of step 908 may comprise more sophisticated evaluation, such as processing the data relating to current requirements (and/or consumption profiles) to make the selection. For example, in one embodiment, the current-versus-time data for each port over a historical or current period (which may start for example as soon as the device is plugged into the port) is evaluated to determine peak current demands and/or profile. An allocation scheme that initially allocates power so as to envelope the peak(s) where peaks occur frequently, or as some lower fraction of the peak where the peaks are very intermittent, may then be selected for example.

The selection algorithm (where used) may also be configured to detect artifacts or match templates/patterns, so as to identify specific operational events. For instance, a current profile of a significantly varying current, followed by a period of very low and effectively constant consumption, may indicate that the relevant device has entered a sleep or inactivity mode. This can be used in lieu of e.g., providing communications or signaling from the powered device itself.

It will also be noted that the priority level given to a port (or group of ports) by the power controller may be coupled to the types of uses for the power required by each port. Specifically, in one aspect, uses for power supplied via the port can be classified according to their "essentiality". For instance, while recharging of the battery in a portable device may be highly desirable as previously described, it may not be essential (at least at a given point in time). Such might be the case where appreciable stored energy is already present in the battery. Conversely, power essential for supplying the aforementioned CPU, HDD, display device, communications interface, etc. may be essential in that their loss may cause a loss of user device functionality or "crash". Accordingly, one embodiment of the invention uses information relating to power usage on the powered device on a given port as an input the allocation algorithm. Such information may be communicated over the associated data path between the powered device and the host (e.g., over the data pathways of the USB cable of FIGS. 3-6), over the power pathways themselves (such as via an impressed voltage or impedance/tri-state modulation used to encode data across the power pathways), or even an external data interface (e.g., an associated Bluetooth, WiFi, ultrawideband (UWB)/PAN, or other data link between the host device and the powered device). For instance, a simple 4-bit binary encoding would provide 2E4 or 16 different possible states that may be equated with different operational uses or priorities of power consumption within the powered device. Existing protocols (such as within the extant operating system) may also be readily adapted for transferring such information. Periodic, event-driven, or even random polling of the various connected devices may be used as well if desired.

Myriad other schemes of encoding and communicating data relating to power usage within the various connected devices will be appreciated by those of ordinary skill given the present disclosure, and accordingly are not described further herein.

Additionally, the "scheme" selected in step 908 of the method 900 of FIG. 9 may actually comprise a composite of two or more other schemes or processes, applied e.g., sequentially or in parallel. For instance, a first scheme may be applied across all ports for a period of time (or until an event occurs, such as exceeding a current or voltage threshold on one or more ports), and second scheme across the same ports applied thereafter.

The exemplary power controller may also be configured to apply heterogeneous allocation schemes across different ports or groups of ports. For instance, where the evaluation of step 908 indicates that a certain port is charging its (device) battery, and the other ports are not, but all have the same "baseline" power demands (aside from the charging current), then the charging port can be granted higher or lower priority for a period of time; e.g., until the battery charge is complete or has been allowed to progress to a certain point.

Lastly, per step 910, the then-remaining current is then distributed to one or more of the ports 112 according to the selected scheme(s).

This process 900 (or portions thereof) can be repeated periodically, or upon occurrence of an event, etc. so as effect a dynamic or time-variant allocation of current. For instance, a port that has been assessed to have little activity in terms of current draw or change over time may, after a period of time, become very active, thereby necessitating a re-evaluation of the allocation scheme.

Figure 10:
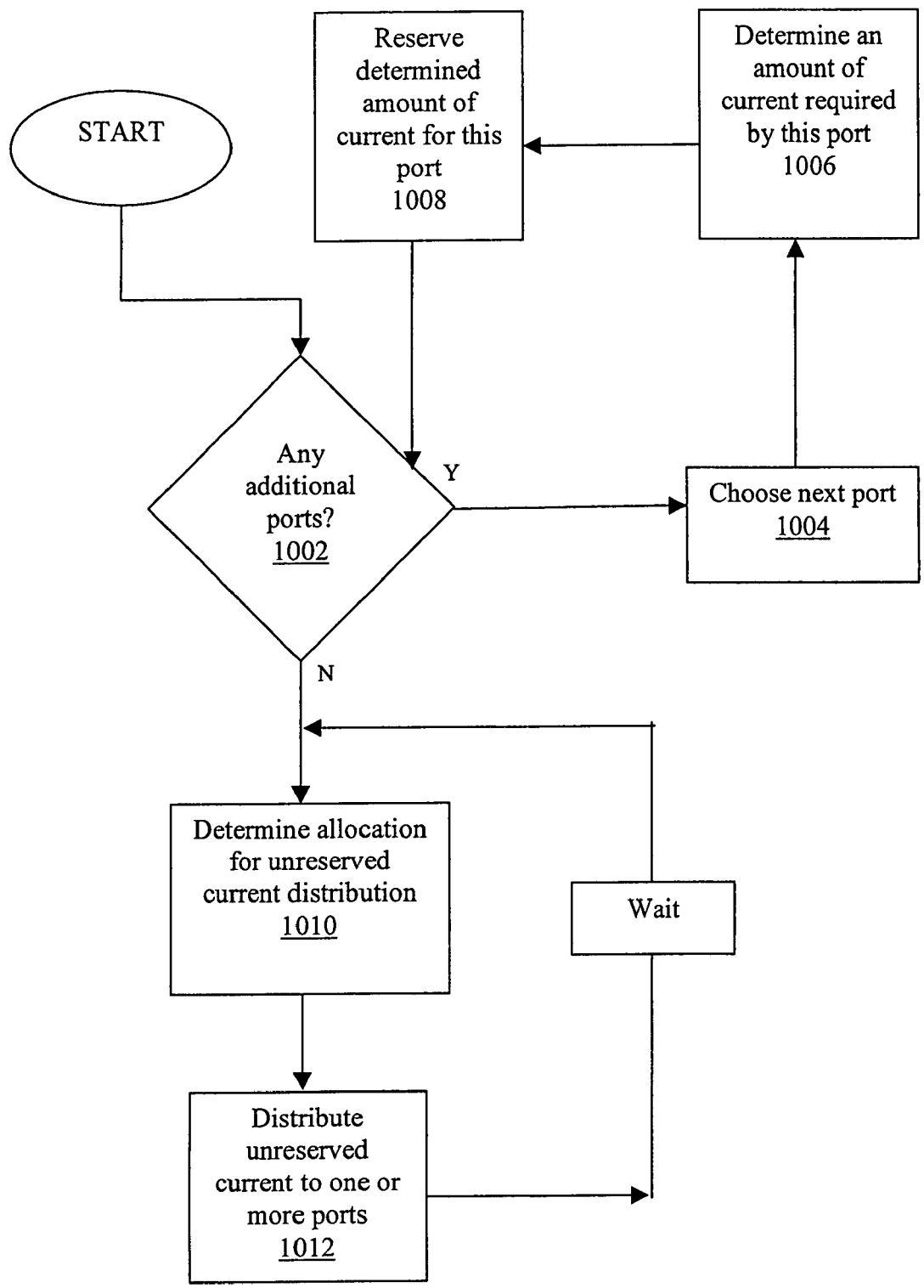
FIG. 10 is a logical flow diagram illustrating a fourth method of distributing current as per one embodiment of the present invention.

FIG. 10 is a flow diagram illustrating a fourth method 1000 of current distribution according to yet another embodiment of the present invention. At steps 1002 and 1004, the next port which has not yet been considered is selected for examination, generally as previously discussed with respect to FIG. 9. At step 1006, an amount of current required by the selected port is determined. This amount is then reserved at step 1008.

When there are no more ports left to consider, the allocation scheme for the unreserved power is determined per step 1010, and any unreserved current is distributed to one or more ports at step 1012 according to the determined scheme. These ports may be the same ports for which steps 1002 through 1008 were performed, additional ports, or any combination thereof. This approach of "reservation before further allocation" is useful for, inter alia, cases where it is desired to reserve a baseline or minimum required power for a certain number of ports before allocating the remaining power. For example, in step 1006, the amount of current required by each port can be set to an essential or baseline value (e.g., via a user interface, or predetermined programming/circuitry) so that at least this amount will be reserved for each port analyzed.

Note also that the scheme selected per step 1010 for distributing the unreserved power may be completely decoupled from the power reservation process in steps 1002-1008. Stated simply, the unreserved power can be allocated according to any manner desired irrespective of how the reserved power is allocated.

Finally, after a certain designated event, the manner in which the unreserved current is distributed is optionally recalculated at step 1010, and then step 1012 (distribution) repeated according to the new scheme. In some embodiments, the aforementioned event comprises a lapse of time. For example, the recalculation at step 1010 may occur at periodic intervals; e.g., every five seconds, such as by means of a clock generator within the host device or power controller. Alternatively, the "event" comprises an affirmative action. In some variants, the aforementioned action comprises detecting an amount of or change in voltage, power, and/or current running across a certain electrical lead, component, or interface. If this amount exceeds (or alternatively, if it falls below) a certain designated threshold, then the recalculation at step 1010 occurs. In other variants, the action comprises receiving a signal. For example, a signal is sent by a serial bus device 116 directly coupled to a port 112 to a host controller 110. When the signal is ultimately received, the recalculation at step 1010 occurs, and the distribution of unreserved power is then performed according to the new allocation as necessary.

Yet other approaches will be readily apparent to those of ordinary skill.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. An apparatus configured to regulate excess current delivered over a plurality of ports within an electronic device, the apparatus comprising:
   a first apparatus adapted to detect an amount of current drawn over a first of the plurality of ports; and
   a second apparatus adapted to distribute a first amount of current available to a second of the plurality of ports, according to a current draw limitation of a serial bus protocol;
   wherein the second apparatus is further adapted to distribute an excess amount of current available to a second of the plurality of ports based at least in part upon the amount of current drawn over the first of the plurality of ports, wherein the excess amount of current exceeds the current draw limitation of the serial bus protocol.

2. The apparatus of claim 1, wherein the apparatus is adapted to interface with a host controller.

3. The apparatus of claim 2, wherein the host controller comprises an IEEE Std. 1394-compliant host controller.

4. The apparatus of claim 2, wherein the host controller comprises a USB-compliant host controller.

5. The apparatus of claim 1, wherein the electronic device comprises a power supply that has a peak efficiency occurring at an output current that is below a maximum rated output current.

6. The apparatus of claim 5, wherein the peak efficiency occurs at an output of approximately 1600 milliamps (mA), and a maximum rated output of approximately 2200 mA.

7. The apparatus of claim 5, wherein the second apparatus adapted to adjust an amount of current available to a second of said plurality of ports based at least in part upon the amount of current drawn over the first of said plurality of ports is further adapted to maintain a total amount of current drawn by all of said plurality of ports at or proximate to said output current corresponding to said peak efficiency.

8. The apparatus of claim 1, wherein the second apparatus is further adapted to adjust the amount of current available to the second of said plurality of ports based at least in part upon a minimum required value.

9. The apparatus of claim 8, wherein the minimum required value comprises 500 milliamps (mA).

10. A method for regulating current delivered over a plurality of ports within an electronic device, comprising:
- detecting an amount of current drawn over a first of the plurality of ports;
- distributing a first amount of current to a second of the plurality of ports according to a current draw limitation of a serial bus protocol;
- communicating a raised amount of current available to at least a second of the plurality of ports based at least in part upon the amount of current drawn over the first of the plurality of ports; and
- wherein the second plurality of ports are adapted to interface with multiple different device types, and wherein the communicated raised amount of current exceeds the current draw limitation imposed by the serial bus protocol.

11. The method of claim 10, wherein at least one of the multiple different device types is Universal Serial Bus (USB) compliant.

12. The method of claim 10, wherein at least one of the multiple different device types is IEEE 1394 compliant.

13. The method of claim 10, wherein the second of the plurality of ports are adapted to interface with one or more different devices simultaneously.

14. The method of claim 10, wherein the second of the plurality of ports are adapted to interface with one or more different devices according to one or more priorities.

15. The method of claim 10, wherein the second of the plurality of ports are adapted to interface with one or more different devices according to one or more temporal considerations.

16. The method of claim 10, wherein the first and second of the plurality of ports have at least one common port.

17. An apparatus for regulating current delivered over a plurality of ports within an electronic device, the apparatus comprising:
- a first apparatus adapted to detect an amount of current drawn over a first of the plurality of ports; and
- a second apparatus adapted to communicate an elevated amount of current available to a second of the plurality of ports based at least in part upon the amount of current drawn over the first of the plurality of port;
- wherein the second of the plurality of ports are adapted to distribute current in excess of a limitation imposed by a bus standard to one or more attached devices based on successful communication with the one or more attached devices.

18. The apparatus of claim 17, wherein at least one of the one or more attached devices is Universal Serial Bus (USB) compliant.

19. The apparatus of claim 17, wherein at least one of the one or more attached devices is IEEE 1394 compliant.

20. The method of claim 17, wherein the second of the plurality of ports are adapted to interface with multiple attached devices simultaneously.

21. The method of claim 20, wherein the distributed excess current varies over time.

* * * * *